(12) United States Patent
Koyama

(10) Patent No.: US 8,447,485 B2
(45) Date of Patent: May 21, 2013

(54) BRAKE HYDRAULIC PRESSURE CONTROLLING APPARATUS FOR VEHICLE

(75) Inventor: Fumitoshi Koyama, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 786 days.

(21) Appl. No.: 12/626,243

(22) Filed: Nov. 25, 2009

(65) Prior Publication Data
US 2010/0138126 A1 Jun. 3, 2010

(30) Foreign Application Priority Data

Dec. 1, 2008 (JP) .................... 2008-306218
Oct. 9, 2009 (JP) .................... 2009-235139

(51) Int. Cl.
*G06F 9/00* (2006.01)
(52) U.S. Cl.
USPC .............................................. 701/70; 303/3
(58) Field of Classification Search
USPC ............... 701/70; 303/3, 15, 20, DIG. 10, 303/119.1, 119.3
See application file for complete search history.

(56) References Cited

U.S. PATENT DOCUMENTS 5,482,362 A * 1/1996 Robinson .................. 303/119.2
5,988,772 A 11/1999 Hashida
6,264,451 B1 * 7/2001 Murayama et al. ........... 418/171
2001/0030461 A1 * 10/2001 Anderson ....................... 303/3
2008/0036291 A1 * 2/2008 Sakai ............................ 303/11

FOREIGN PATENT DOCUMENTS

JP 10-152035 A 6/1998
JP 2003-327108 A 11/2003

* cited by examiner

*Primary Examiner* — Darnell Jayne
*Assistant Examiner* — Sasha T Varghese
(74) *Attorney, Agent, or Firm* — Buchanan Ingersoll & Rooney PC

(57) ABSTRACT

A brake hydraulic pressure controlling apparatus for a vehicle includes a hydraulic pressure block included in a hydraulic pressure unit and including therein a hydraulic circuit, a plurality of electromagnetic valves attached on a surface of the hydraulic pressure block and changing an opening degree of a passage of the hydraulic circuit, and an electronic control unit including an ECU board, which is electrically connected to the electromagnetic valves and on which an electronic control device executing a driving control of each of the electromagnetic valves is provided, and attached on the surface of the hydraulic pressure block so that the ECU board is covered by a case, wherein the ECU board of the electronic control unit is arranged within an area of the surface of the hydraulic pressure block and all of the plurality of the electromagnetic valves are arranged adjacently around the ECU board.

9 Claims, 7 Drawing Sheets

BRAKE HYDRAULIC PRESSURE CONTROLLING APPARATUS FOR VEHICLE

CROSS REFERENCE TO RELATED APPLICATIONS

This application is based on and claims priority under 35 U.S.C. §119 to Japanese Patent Application 2008-306218, filed on Dec. 1, 2008, Japanese Patent Application 2009-235139, filed on Oct. 9, 2009, the entire content of which are incorporated herein by reference.

FIELD OF THE INVENTION

The present invention generally relates to a brake hydraulic pressure controlling apparatus for a vehicle having a combination of a hydraulic pressure unit and an electronic control unit. More specifically, the present invention pertains to a brake hydraulic pressure controlling apparatus for a vehicle that achieves downsizing thereof without being influenced by a layout restriction of an electric wire, which electrically connects an electromagnetic valve provided at a hydraulic pressure block of a hydraulic pressure unit and a circuit board (an ECU board) of an electronic control unit.

BACKGROUND

A known brake hydraulic pressure controlling apparatus for a vehicle (which will be hereinafter referred to as a hydraulic pressure controlling apparatus) is disclosed in, for example, JP2003-327108A and JPH10-152035A.

According to the brake hydraulic pressure controlling apparatus disclosed in JP2003-327108A, a hydraulic circuit is formed within the brake hydraulic pressure controlling apparatus. Furthermore, the brake hydraulic pressure controlling apparatus includes a hydraulic pressure unit which is configured in a manner where a motor for driving a pump, which is formed within the brake hydraulic pressure controlling apparatus, and an electromagnetic valve are provided at a hydraulic pressure block including the pump. The hydraulic pressure unit is connected to an electronic control unit.

The electromagnetic valve is a valve that changes an opening degree of a passage of the hydraulic circuit. More specifically, according to the brake hydraulic pressure controlling apparatus disclosed in JP2003-327108A, plural electromagnetic valves are provided on one surface of the hydraulic pressure block.

The electronic control unit includes an ECU board and a case. The ECU board, which is electrically connected to each of the electromagnetic valves and has an electronic control device for executing a drive control of the electromagnetic valves, is accommodated within the case. The electronic control unit having the above-described configuration is attached at the surface of the hydraulic pressure block having the electromagnetic valves, thereby covering both the electromagnetic valves and the electronic control unit by the case. Furthermore, the motor for driving the pump (a motor having a rotational output shaft, which will be hereinafter referred to as a rotating motor) is provided on the other surface, which is opposite from the surface on which the electromagnetic valves of the hydraulic pressure block are assembled, so that an axis of the motor extends orthogonal to the surface of the hydraulic pressure block having the plural electromagnetic valves.

According to the hydraulic pressure controlling apparatus disclosed in JPH10-152035A, a hydraulic circuit portion of an electromagnetic valve is provided at a hydraulic pressure controlling unit and a coil of the electromagnetic valve is provided at an electronic control unit, so that the electromagnetic valve is assembled simultaneously when the hydraulic pressure controlling unit is connected to the electronic control unit. Furthermore, JPH10-152035A discloses an embodiment in which the hydraulic pressure controlling unit and the electronic control unit are arranged so that a setting area of the electromagnetic valve of the hydraulic pressure controlling unit overlaps with a setting area of an ECU board of the electronic control unit in an axial direction of the electromagnetic valve, and another embodiment in which the setting area of the electromagnetic valve of the hydraulic pressure controlling unit does not overlap with the setting area of the ECU board of the electronic control unit. The embodiment in which the setting area of the electromagnetic valve of the hydraulic pressure controlling unit overlaps with the setting area of the ECU board of the electronic control unit is also adapted to the hydraulic pressure controlling apparatus disclosed in JP2003-327108A.

According to the hydraulic pressure controlling apparatus disclosed in JP2003-327108A, a setting area of the electromagnetic valve overlaps with a setting are of the ECU board in an axial direction of the electromagnetic valves. Therefore, the ECU board is arranged at a position away from the hydraulic pressure controlling unit relative to the electromagnetic valves in order to avoid a mutual interference between wires that electrically connect each electromagnetic valve and the electric circuit on the ECU board. As a result, a size of the hydraulic pressure controlling unit in the axial direction of the electromagnetic valves (i.e. a size of the hydraulic pressure controlling unit in a direction orthogonal to a surface of the hydraulic pressure block on which the electromagnetic valves are provided) is likely to be elongated. More specifically, according to the hydraulic pressure controlling apparatus disclosed in JP2003-327108A using the rotating motor as a pump driving source, the rotating motor is provided at an end surface of the hydraulic pressure block opposite from the surface thereof on which the electromagnetic valves are assembled. Therefore, an enlargement of a size of the entire hydraulic pressure controlling apparatus in the axial direction of the electromagnetic valves is unavoidable. Furthermore, because a size of the ECU board is set so as to correspond to the setting area of the electromagnetic valves, the size of the ECU board is likely to be enlarged.

The hydraulic pressure controlling apparatus disclosed in JPH10-152035A having the configuration, in which the setting area of the electromagnetic valve overlaps with the setting area of the ECU board in the axial direction of the electromagnetic valve, has drawbacks mentioned above. Additionally, according to the hydraulic pressure controlling apparatus disclosed in JPH10-152035A having the configuration in which the setting area of the electromagnetic valve does not overlap with the setting area of the ECU board in the axial direction of the electromagnetic valve, the size of the ECU board does not need to be set so as to correspond to the setting area of the electromagnetic valve. As a result, the size of the ECU board may be decreased. However, as illustrated in FIG. 2 of JPH10-152035A, in a case where the electromagnetic valves are arranged to be aligned in one direction, a size of the hydraulic pressure controlling apparatus in an arrangement direction of the electromagnetic valves may be enlarged in the direction to which the electromagnetic valves the aligned.

A need thus exists to provide a brake hydraulic pressure controlling apparatus for a vehicle which is not susceptible to the drawback mentioned above.

SUMMARY OF THE INVENTION

According to an aspect of the present invention, a brake hydraulic pressure controlling apparatus for a vehicle includes a hydraulic pressure block included in a hydraulic pressure unit and including therein a hydraulic circuit, a plurality of electromagnetic valves attached on a surface of the hydraulic pressure block and changing an opening degree of a passage of the hydraulic circuit, and an electronic control unit including an ECU board, which is electrically connected to the electromagnetic valves and on which an electronic control device executing a driving control of each of the electromagnetic valves is provided, and attached on the surface of the hydraulic pressure block so that the ECU board is covered by a case, wherein the ECU board of the electronic control unit is arranged within an area of the surface of the hydraulic pressure block and all of the plurality of the electromagnetic valves are arranged adjacently around the ECU board.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Embodiments of a brake hydraulic pressure controlling apparatus will be described below with reference to FIGS. 1 to 9 of the attached drawings.

First Embodiment

Figure 1:
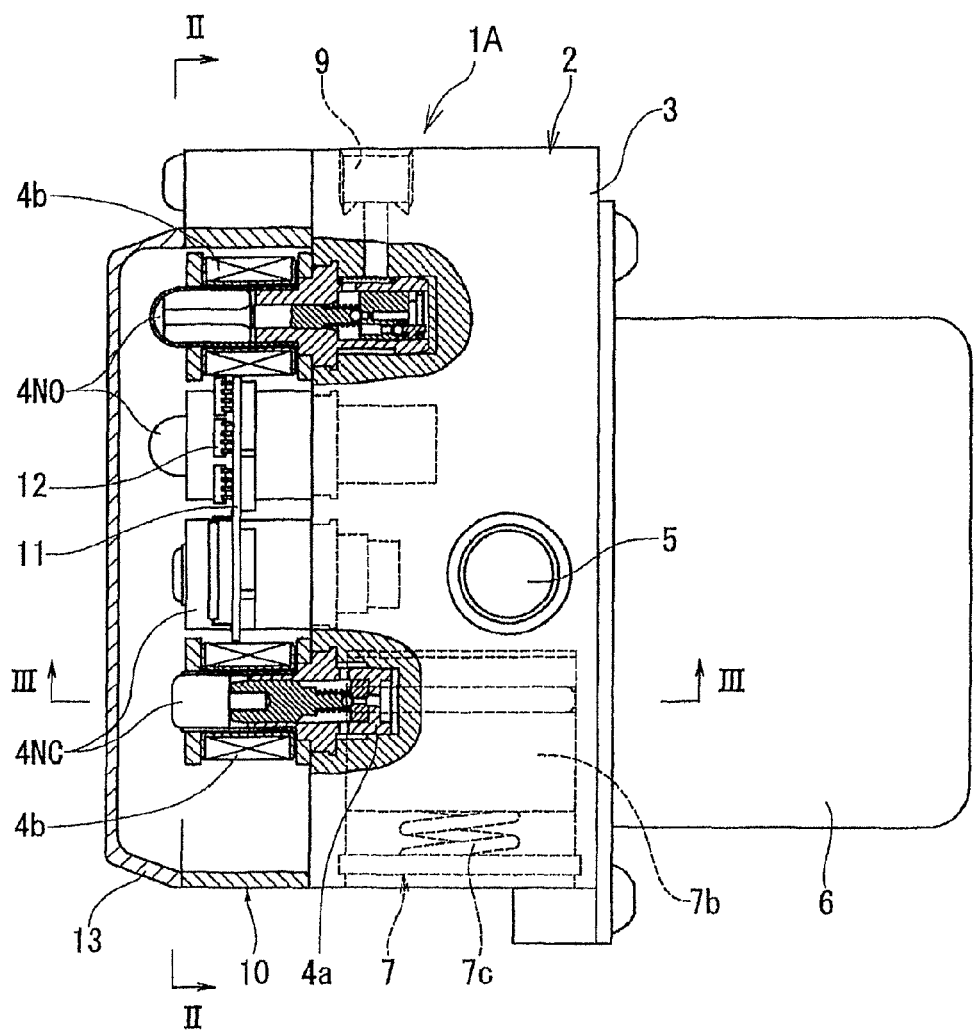
FIG. 1 is a partial fragmentary side view illustrating a brake hydraulic pressure controlling apparatus according to a first embodiment.

A brake hydraulic pressure controlling apparatus 1A illustrated in FIG. 1 is configured with a combination of a hydraulic pressure unit 2 and an electronic control unit 10.

The hydraulic pressure unit 2 includes a hydraulic pressure block 3 within which a hydraulic circuit is formed. An electromagnetic valve 4 for changing an opening degree of a passage of the hydraulic circuit is provided at one surface of the hydraulic pressure block 3. In this embodiment, plural electromagnetic valves 4 are provided at the hydraulic pressure block 3. Furthermore, a pump 5 (i.e. a piston pump is adapted as the pump 5 in this embodiment, however, a gear pump may be adapted) is provided within the hydraulic pressure block 3. Additionally, a motor 6 (a rotating device 6 serving as a driving source) for driving the pump 5, is provided at the other surface of the hydraulic pressure block 3 (i.e. a surface opposite from the surface on which the electromagnetic valves 4 are provided). More specifically, in this embodiment, an electronic motor is adapted as the motor 6 (the rotating device). The hydraulic pressure unit 2 includes therewithin a reservoir 7 and a damper 8. Furthermore, a connecting port 9 for connecting the hydraulic circuit, which is provided within the hydraulic pressure block 3, with a wheel cylinder or a master cylinder, is provided at one of surfaces of the hydraulic pressure block 3 on which the electromagnetic valves 4 and the motor 6 are not provided.

The electromagnetic valves 4 include a pressure-reducing electromagnetic valve for reducing a hydraulic pressure applied to the wheel cylinder, a pressure-increasing electromagnetic valve for increasing the hydraulic pressure applied to the wheel cylinder, a cutoff valve, an electromagnetic valve and the like. The cutoff valve is provided at, for example, a hydraulic pressure passage connecting the master cylinder and the wheel cylinder, a drain passage connecting the master cylinder and the reservoir 7 or at a hydraulic pressure passage connecting a master cylinder and a stroke simulator of a brake-by-wire type brake hydraulic pressure controlling apparatus. The electromagnetic valve switches a communication state of the hydraulic passage having a dual circuit system.

Each of the electromagnetic valves 4 changes the opening degree of the passage between a fully interrupting state, in which the passage is fully blocked, and a fully opened state, in which the passage is fully opened. Alternatively, the electromagnetic valves 4 may be configured to as to change the opening degree of the passage in response to a control current supplied thereto. Know methods are used for changing the opening degree of the passage by each of the electromagnetic valves 4, therefore, a detailed explanation is omitted here.

The electromagnetic valves 4, each of which changes the state of the passage between the fully interrupted state and the fully opened state, include a normally-open type electromagnetic valve and a normally-closed type electromagnetic valve. According to the normally-open type electromagnetic valve, a valve portion thereof is closed when a driving electric power is supplied thereto and is opened when the driving electric power is not supplied thereto. On the other hand, according to the normally-closed type electromagnetic valve, a valve portion thereof is opened when the driving electric power is supplied thereto and is closed when the driving electric power is not supplied thereto. In a general brake hydraulic pressure controlling apparatus for a vehicle, both the normally closed type electromagnetic valve and the normally opened type electromagnetic valve are used. In this embodiment, the brake hydraulic pressure controlling apparatus 1A includes both the normally-closed type electromagnetic valve and the normally-open type electromagnetic valve.

As illustrated in FIG. 1, each of normally-closed type electromagnetic valves 4NC is generally configured so that a length of a portion 4a thereof, which is inserted into the hydraulic pressure block 3, is formed to be shorter than a corresponding portion of each of normally-open type electromagnetic valves 4NO. Furthermore, in this embodiment, two normally-closed type electromagnetic valves 4NC are arranged between the reservoir 7 and the damper 8 (see FIG. 2).

The electronic control unit 10 includes a circuit board (which will be hereinafter referred to as an ECU board 11) and a case 13 for covering the ECU board 11. The electronic control unit 10 is attached on the surface of the hydraulic pressure block 3, on which the electromagnetic valves 4 are arranged. Furthermore, a coil 4b of each of the electromagnetic valves 4 (i.e. the coil 4b of each of the normally-closed type electromagnetic valves 4NC and the coil 4b of each of the normally-open type electromagnetic valves 4NO) protruding from the hydraulic pressure block 3 is also covered by the case 13.

The ECU board 11 is a board on which an electronic control device 12 (an ECU 12) is provided. The electronic control device 12 determines whether or not a hydraulic pressure control needs to be executed on the basis of a vehicle behavior information, a brake operation information inputted by a driver or the like. The electronic control device 12 executes a driving control of each of the electromagnetic valves 4 and a driving control of the motor 6 in a case where the driving control of the electromagnetic valves 4 or the motor 6 is determined to be necessary. A coil terminal 16 of each of the electromagnetic valves 4 (i.e. the coil terminal 16 of each of the normally-closed type electromagnetic valves 4NC and the normally-open type electromagnetic valves 4NO) is electrically connected to an electric circuit provided on the ECU board 11, so that the driving electric power is supplied to the coil 4b of each of the electromagnetic valves 4 via the electric circuit. The ECU board 11 is not limited to a general board in which the electronic control device 12, which is mounted on the board, is exposed.

As a known circuit board having the electric circuit, there exists a package board, in which an integrated circuit is molded by means of resin P together with the board. A size of the package board is easily reduced. Accordingly, in a case where the package board is adapted as the ECU board 11, a size of the ECU board 11 may be reduced.

Figure 2:
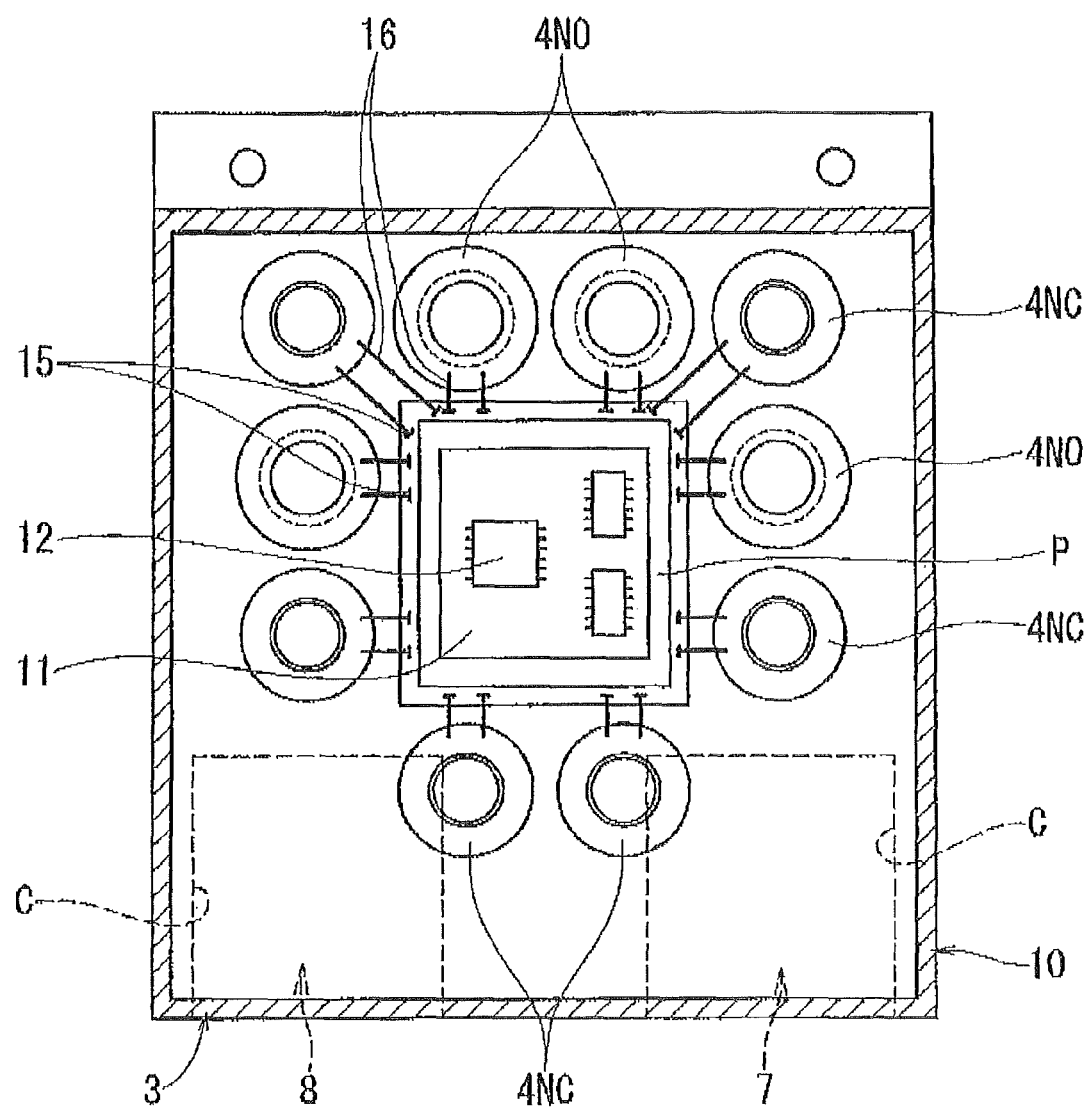
FIG. 2 is a view taken along line II-II in FIG. 1 in order to illustrate a positional relationship between electromagnetic valves of the apparatus illustrated in FIG. 1 and an ECU board.

As illustrated in FIGS. 1 and 2, the electromagnetic valves 4 are arranged so as to adjacently surround the ECU board 11. More specifically, according to the brake hydraulic pressure controlling apparatus 1A of the first embodiment, the electromagnetic valves 4 are arranged along four sides of the ECU board 11, so that the ECU board 11 is surrounded by the coils 4b of the respective electromagnetic valves 4, i.e. so that the ECU board 11 is positioned closer to the hydraulic pressure block 3 relative to end portions of the respective electromagnetic valves 4. Accordingly, by arranging the electromagnetic valves 4 around the ECU board 11, each of the electromagnetic valves 4 is electrically connected to the electric circuit of the ECU board 11 while avoiding interference between each connecting wire even if the ECU board 11 is not arranged at a position away from the hydraulic pressure unit 2 relative to the electromagnetic valves 4. Additionally, the electromagnetic valves 4 may be arranged along two sides or three sides out of four sides of the ECU board 11. Furthermore, the ECU board 11 may be modified so that a portion thereof protrudes in a direction opposite from the hydraulic pressure block 3 relative to the end portions of the respective electromagnetic valves 4 (i.e. the end portions of the electromagnetic valves 4 protruding from the hydraulic pressure block 3 in the axial direction of the electromagnetic valves 4).

Figure 4:
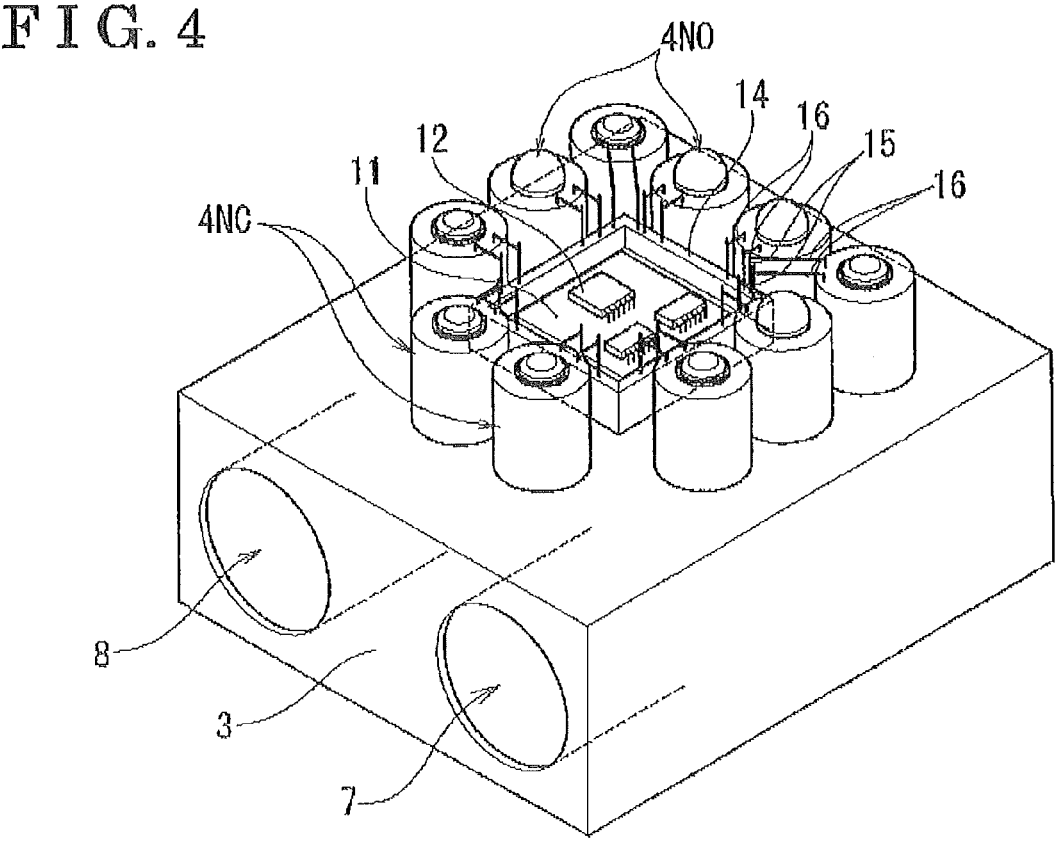
FIG. 4 is a perspective view schematically illustrating an example of an electrical connection between the electromagnetic valves and the ECU board.

An example of an electric connection will be described below in accordance with FIG. 4. As illustrated in FIG. 4, the brake hydraulic pressure controlling apparatus 1A includes a board holder 14, which is formed in a tray shape and which accommodates therein the ECU board 11. The board holder 14 includes bus bar terminals 15, which are molded to a board material. The electric circuit of the ECU board 11 is electrically connected to the bus bar terminals 15. Furthermore, the bus bar terminals 15 are electrically connected to the coil terminals 16 of the electromagnetic valves 4, respectively, by means of soldering and the like. Accordingly, the board holder 14 is supported by means of the bus bar terminals 15 and the coil terminals 16, which are connected to each other. Alternatively, the board holder 14 may be directly fixed on the hydraulic pressure block 3. Alternatively, the board holder 14 may be supported by a supporting member, which is attached on the hydraulic pressure block 3.

As illustrated in FIG. 4, the electromagnetic valves 4 are arranged so as to adjacently surround the ECU board 11, so that the entire ECU board 11 is arranged at a position closer the hydraulic pressure block 3 relative to the protruding end portions of the respective electromagnetic valves 4. As a result, the coils 16 of the respective electromagnetic valves 4 may be electrically connected to the electric circuit of the ECU board 11 while avoiding the interference between each of the electric wires. Accordingly, a size of the brake hydraulic pressure controlling apparatus 1A in the axial direction of the electromagnetic valves 4 may be reduced.

Figure 3:
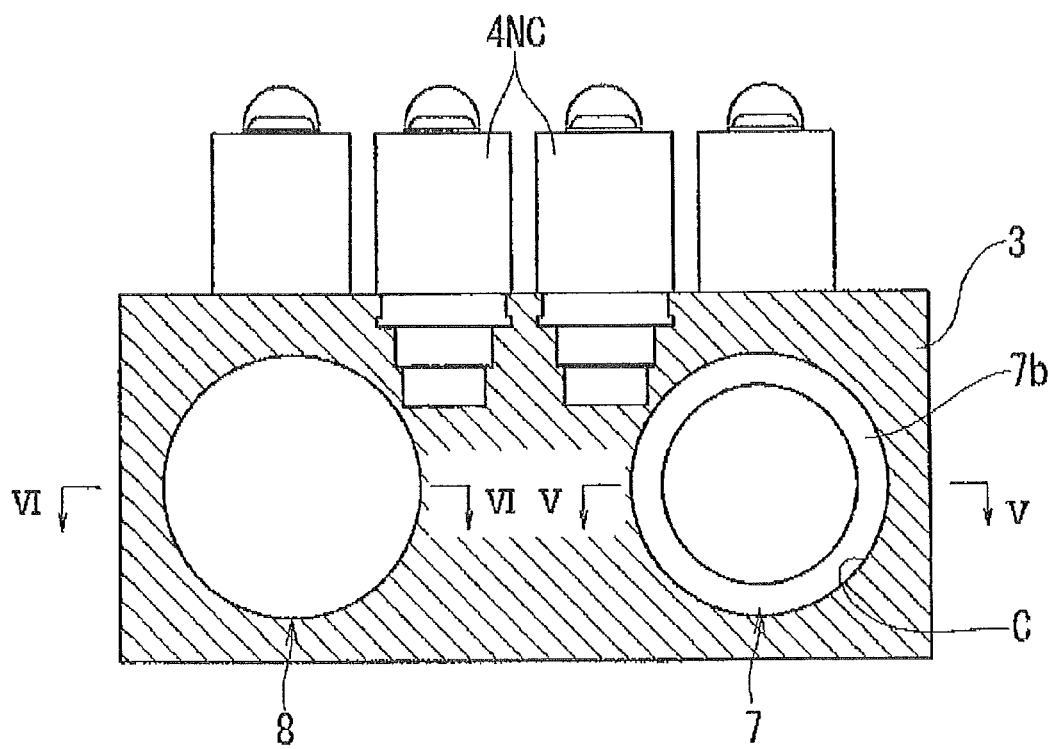
FIG. 3 is a cross-sectional view taken along line in FIG. 1.

Two cavities C are formed at the hydraulic pressure block 3, so that the cavities C serve as the reservoir 7 and the damper 8, respectively. More specifically, each of the cavities C, whose cross-sectional shape relative to the axial direction thereof is formed in a circular shape, is formed so that the axis thereof extends along the surface of the hydraulic pressure block 3 for arranging the electromagnetic valves 4. In other words, the each of the cavities C extends so as not to be orthogonal to the surface of the hydraulic pressure block 3 on which the electromagnetic valves 4 are arranged. Furthermore, the cavities C are arranged in parallel with each other so as to overlap with each other when being viewed from a radial direction thereof. A diameter of each of the cavities C is set so as to be greater than a diameter of the hydraulic circuit, which is connected to the cavities C and which is formed within the hydraulic pressure block 3. Accordingly, as illustrated in FIG. 3, a constriction portion is formed between two cavities C within the hydraulic pressure block 3. According to the first embodiment, the portions 4a of the respective two normally-closed type electromagnetic valves 4NC are embedded into the constriction portion in order to effectively utilize spaces and portions of the hydraulic pressure block 3, which may result in reducing the size of the brake hydraulic pressure controlling apparatus 1A.

Figure 5:
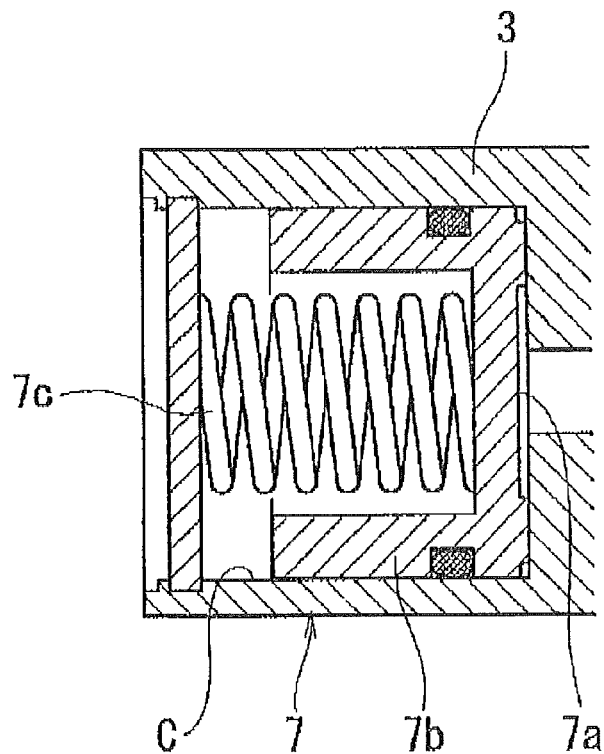
FIG. 5 is a cross-sectional view taken along line V-V in FIG. 3.

Illustrated in FIG. 5 is a cross-sectional view of the reservoir 7. A known reservoir is adapted as the reservoir 7. More specifically, the reservoir 7 includes a fluid storing chamber 7a, a piston 7b for increasing and decreasing a volume of the fluid storing chamber 7a, and a spring 7c for biasing the piston 7b in a direction in which the volume of the fluid storing chamber 7a is decreased. Furthermore, the reservoir 7 is configured so that a brake fluid, which is discharged from the wheel cylinder of the wheel, is introduced into the fluid storing chamber 7a when at least one of the normally-closed type electromagnetic valves 4NC, which are provided at the hydraulic circuit led to an inlet/outlet port of the fluid storing chamber 7a and which change the opening degree of the hydraulic circuit, is opened. The introduced brake fluid is temporarily stored within the fluid storing chamber 7a, then is returned to the hydraulic circuit, which is connected to the wheel cylinder, when the pump 5 is driven to suck the brake fluid when necessary.

Figure 6:
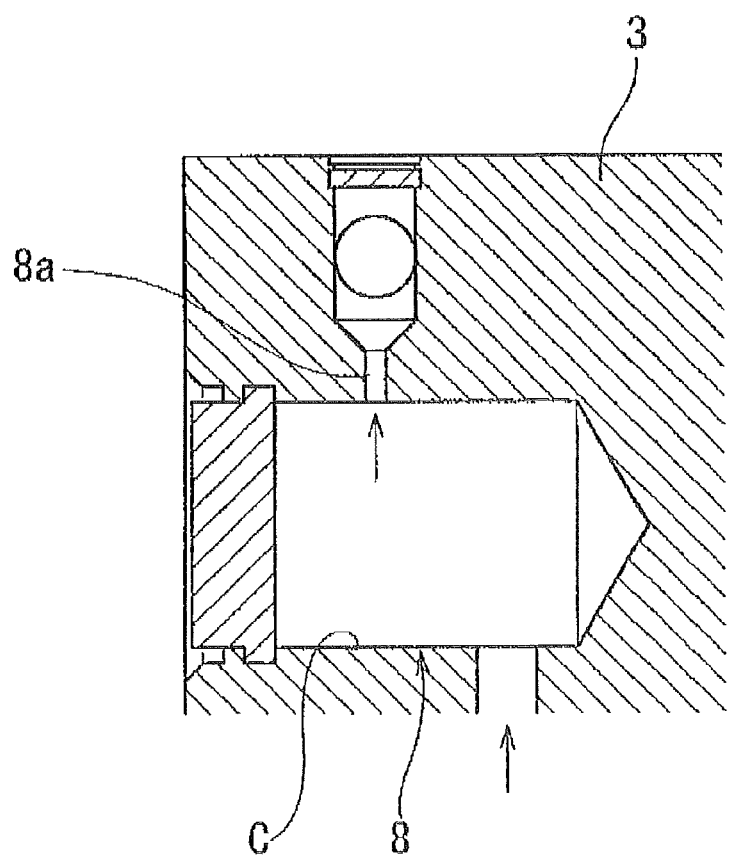
FIG. 6 is a cross-sectional view taken along line VI-VI in FIG. 3.

Illustrated in FIG. 6 is a cross-sectional view of the damper 8. The damper 8 is provided at a discharge circuit of the pump 5 in order to attenuate a pulsation of the hydraulic pressure generated when the pump 5 discharges the brake fluid. A know damper is adapted as the damper 8. More specifically, the damper 8 includes an orifice 8a at an outlet side of the cavity C, whose diameter is set to be larger than a diameter of the hydraulic circuit formed within the hydraulic pressure block 3. The discharge pulsation of the pump 5 is attenuated in a manner where the brake fluid, which is discharged from the pump 5, is introduced into the damper 8 so as to flow therethrough. In the first embodiment, the reservoir 7 and the damper 8 are arranged in parallel with each other. However, in a case where the brake hydraulic pressure controlling apparatus 1A is modified so as to include plural reservoirs 7 or plural dampers 8, only the reservoirs 7 or the dampers 8 may be arranged in parallel with each other, so that the normally-closed type electromagnetic valves 4NC are provided between the neighboring reservoirs 7 or between the neighboring dampers 8.

According to the first embodiment, the brake hydraulic pressure controlling apparatus 1A includes the motor 6 for driving the pump 5 at the surface opposite from the surface of the hydraulic pressure block 3 on which the electromagnetic valves 4 are attached. Generally, a length of the entire hydraulic pressure controlling apparatus tends to be increased in the axial direction of the electromagnetic valves 4. However, because the electromagnetic valves 4 are arranged so as to adjacently surround the ECU board 11 in this embodiment, a length of the brake hydraulic pressure controlling apparatus 1A in the axial direction of the electromagnetic valves 4 may be shortened when comparing to a known brake hydraulic pressure controlling apparatus in which electromagnetic valves are not arranged so as to adjacently around an ECU board. As a result, the size of the brake hydraulic pressure controlling apparatus 1A may be further reduced. Furthermore, because the entire ECU board 11 is arranged between the end portion of each of the electromagnetic valves 4 (i.e. the protruding end portions of the respective electromagnetic valves 4 in an axial direction thereof) and the surface of the hydraulic pressure block 3 on which the electromagnetic valves 4 are arranged, the ECU 11 is avoided from protruding relative to the end portion of each of the electromagnetic valves 4 in the direction opposite to the hydraulic pressure block 3. In other words, an increase of the length of the brake hydraulic pressure controlling apparatus 1A in the axial direction of the electromagnetic valves 4 because of the ECU board 11 may be avoided. As a result, the size (i.e. the length) of the brake hydraulic pressure controlling apparatus 1A in the axial direction is further reduced.

Second Embodiment

Figure 7:
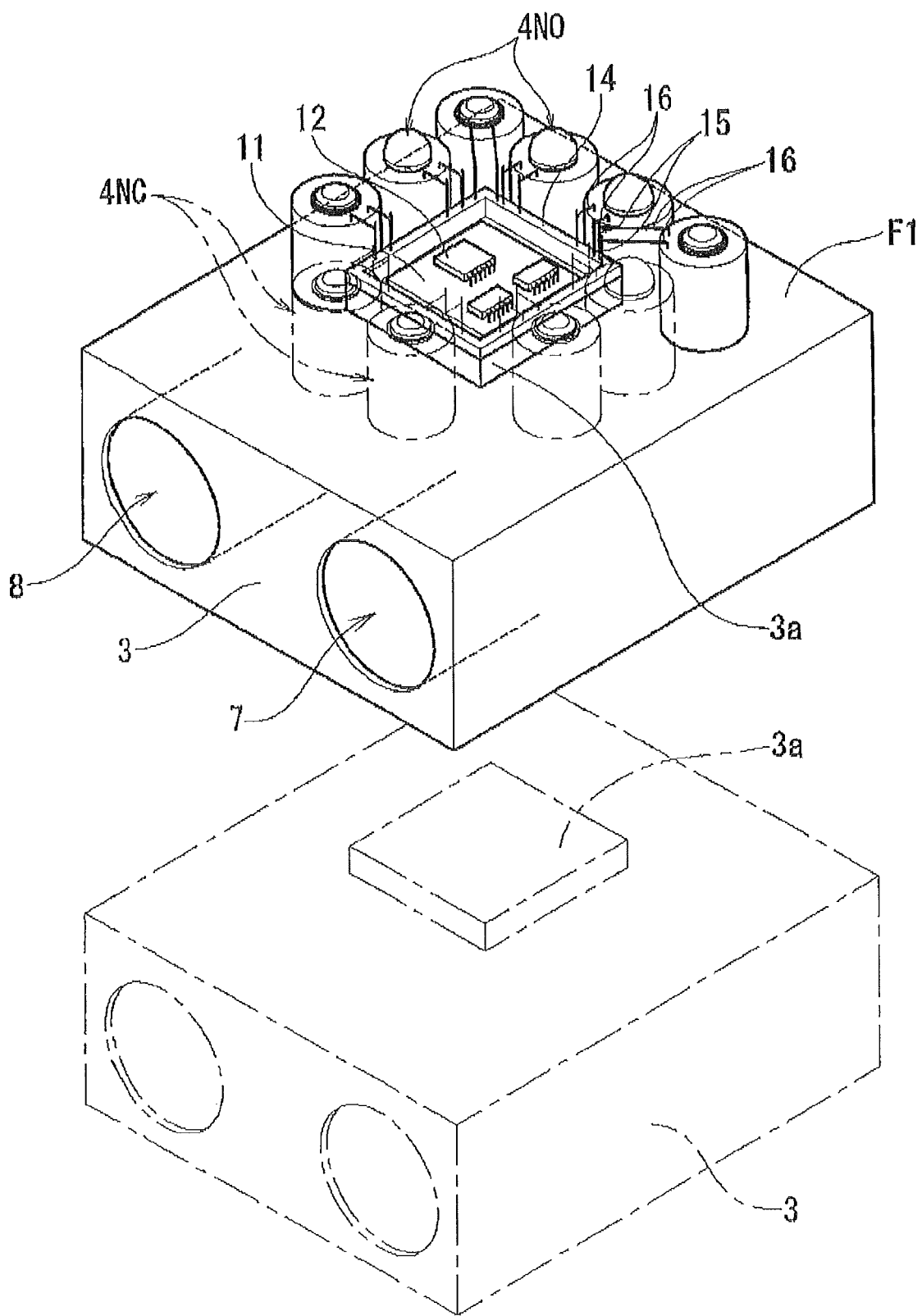
FIG. 7 is a perspective view illustrating main portions of a brake hydraulic pressure controlling apparatus according to a second embodiment.

A second embodiment of a brake hydraulic pressure controlling apparatus will be described below with reference to FIGS. 7 and 8 of the attached drawings. The brake hydraulic pressure controlling apparatus 1B of the second embodiment differs from the brake hydraulic pressure controlling apparatus 1A of the first embodiment in that heat dissipation of the ECU board is further improved. According to the second embodiment, a protruding portion 3a is formed on the hydraulic pressure block 3 in a manner where a portion of the surface, on which the electromagnetic valves 4 are attached, is protruded so as to correspond to the ECU board 11. The ECU board 11 is arranged so as to contact the protruding portion 3a.

Accordingly, in the case where the protruding portion 3a is formed on the hydraulic pressure block 3 in order to arrange the ECU board 11 so as to contact the protruding portion 3a, the heat dissipation of the ECU board 11 is improved when comparing to the ECU board 11 of the first embodiment.

More specifically, in a case where a contact area of the ECU board 11 relative to the protruding portion 3a is set to be wider, heat transmission from the ECU board 11 to the protruding portion 3a is smoothly performed.

Figure 8:
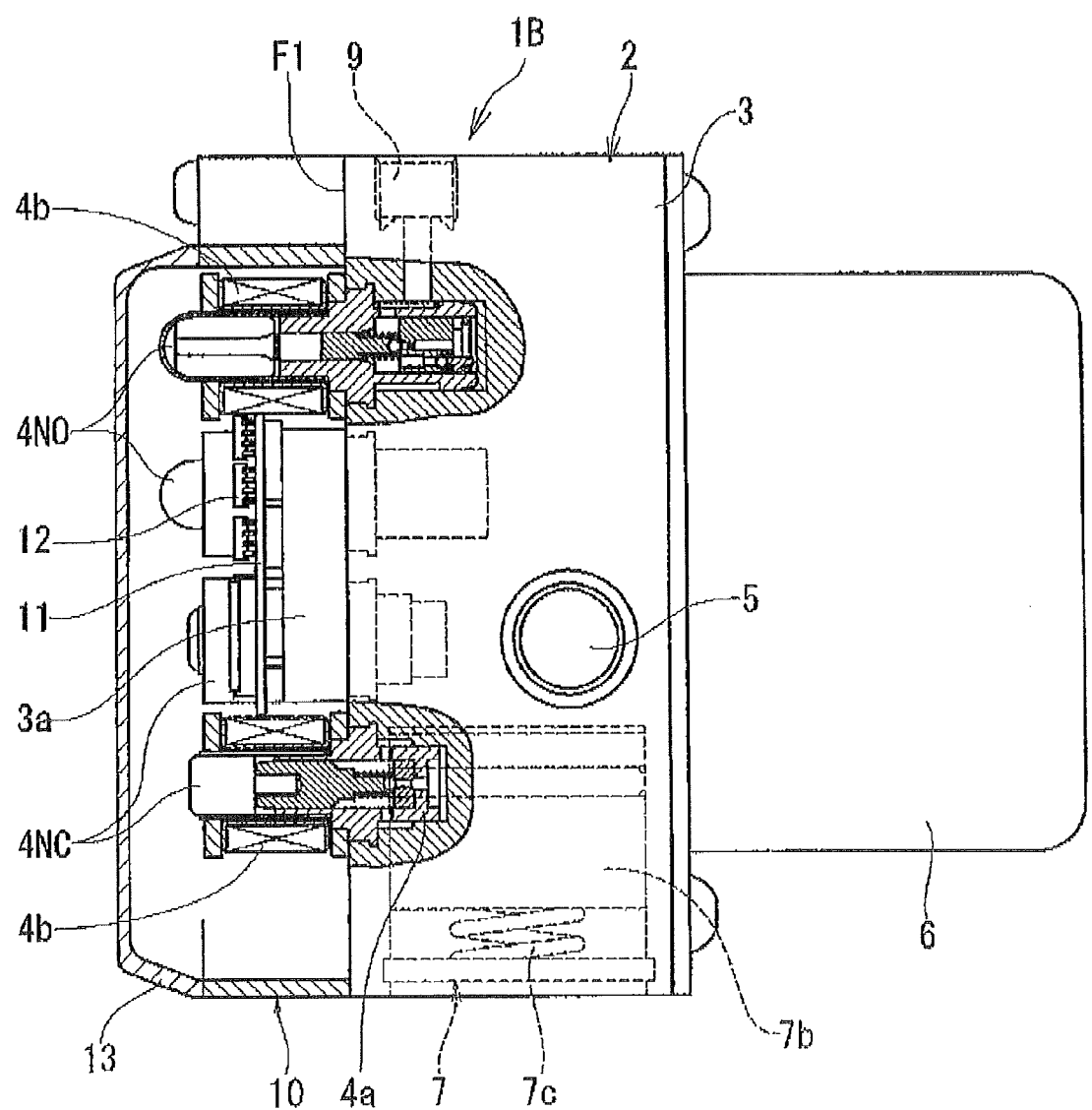
FIG. 8 is a partial fragmentary side view illustrating the brake hydraulic pressure controlling apparatus according to the second embodiment.

Furthermore, as illustrated in FIG. 8, a wire connection between the ECU board 11 and the electromagnetic valves 4 (the coil portions 4b) may be simplified in a case where the ECU board 11 is arranged at a position corresponding to an end portion side of exposed portions of the electromagnetic valves 4 (the left side of the electromagnetic valves 4 in FIG. 8) relative to a surface F1 of the hydraulic pressure block 3, on which the electromagnetic valves 4 are attached, in order to substantially correspond a position of a surface of the ECU board 11 facing opposite to the hydraulic pressure block 3 to the end portions of the electromagnetic valves 4 exposed from the hydraulic pressure block 3. However, in this case a dead space is formed between the surface F1 and the ECU board 11. Therefore, according to the second embodiment, the protruding portion 3a is formed on the surface F1 so as to utilize the dead space efficiently. Accordingly, heat generated at components provided on the ECU board 11 is transmitted to the hydraulic pressure block 3 via the protruding portion 3a. As a result, the entire hydraulic pressure block 3 serves as a heat mass having a great heat capacity, which further results in improving a heat dissipation characteristic of the ECU board 11.

The brake fluid frequently flows through the hydraulic circuit formed within the hydraulic pressure block 3 while a braking operation of the vehicle is performed, so that the brake fluid efficiently dissipates the heat as a heat medium. Accordingly, using the hydraulic pressure block 3 as the heat mass contributes to improve cooling efficiency of the ECU board 11.

Figure 9:
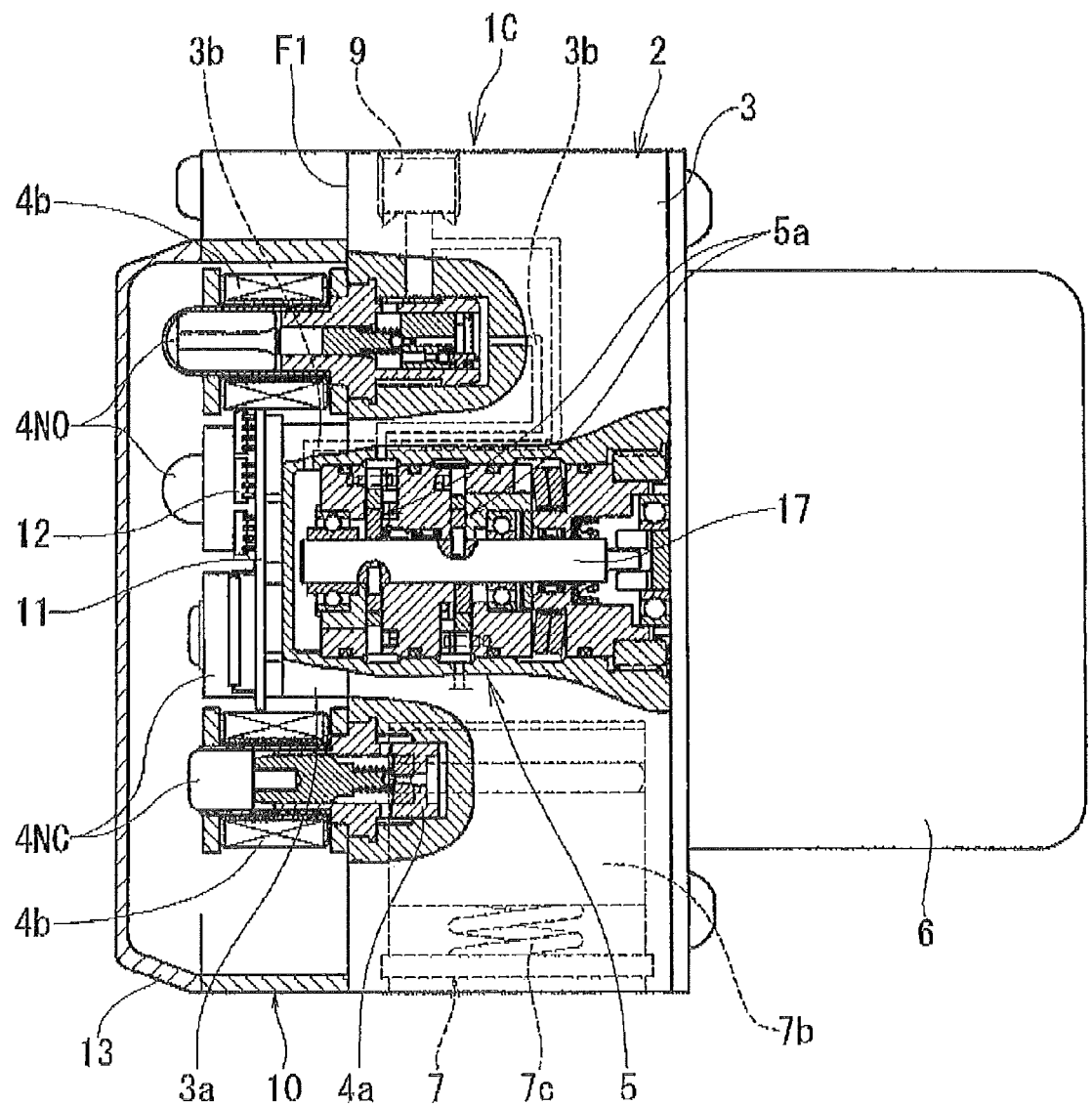
FIG. 9 is a partial fragmentary side view illustrating a modified example of the brake hydraulic pressure controlling apparatus of the second embodiment.

Illustrated in FIG. 9 is a modified example of the brake hydraulic pressure controlling apparatus of the second embodiment. The brake hydraulic pressure controlling apparatus 1C of the modified example differs from the brake hydraulic pressure controlling apparatus 1B of the second embodiment in a configuration of the of the hydraulic circuit of the hydraulic pressure block 3 and an arrangement of the pump 5. Therefore, only the difference between the brake hydraulic pressure controlling apparatus 1B of the second embodiment and the brake hydraulic pressure controlling apparatus 1C of the modified example will be described below. As illustrated in FIG. 9, a portion of a hydraulic circuit 3b, which is formed within the hydraulic pressure black 3, is formed within the protruding portion 3a. According to the above-described configuration, an inner space of the protruding portion 3a is efficiently utilized. Furthermore, the heat is further efficiently absorbed by the brake fluid flowing inside the hydraulic circuit 3b (i.e. a heat absorption efficiency by the brake fluid is further improved) when comparing to the second embodiment. As a result, the cooling efficiency of the ECU board 11 is further enhanced.

According to the brake hydraulic pressure controlling apparatus 1C illustrated in FIG. 9, at least a portion of the pump 5, which is provided within the hydraulic pressure block 3, is arranged at the interior of the protruding portion 3a.

Accordingly, because at least a portion of the pump 5 is arranged at the interior of the protruding portion 3a, the inner space of the hydraulic pressure block 3 is further utilized. Furthermore, even if the brake hydraulic pressure controlling apparatus 1C is modified so that a size of the pump 5 is increased in the axial direction of the electromagnetic valves 4 (i.e. a size of the motor in an axial direction thereof) which may result in enlarging the size of the hydraulic pressure block 3 in the axial direction, the entire hydraulic pressure block 3 does not need to be enlarged, but only a size of the protruding portion 3a needs to be changed. As a result, the brake hydraulic pressure controlling apparatus 1C may contribute to reduce a weight thereof.

The hydraulic pressure block 3 includes therein the gear pump. Illustrated in FIG. 9 is an example of configurations of the brake hydraulic pressure controlling apparatus. In this modified example, the brake hydraulic pressure controlling apparatus 1C is configured so that a tandem-type rotary pump, in which plural pump rotors 5a are arranged so as to be in parallel with one another in the axial direction of the electromagnetic valves 4, is provided within the hydraulic pressure block 3. An internal gear pump is used as each of the pump rotors 5a. More specifically, each of the pump rotors 5a includes an inner rotor and an outer rotor, whose number of teeth differ from each other and which are engaged with each other. The inner rotor is fixed on a driving shaft 17, which is connected to the motor 6. Accordingly, when the motor 6 is driven, a driving force generated by the motor 6 is transmitted to the inner rotor, then the outer rotor is rotatably driven in response to a rotation of the inner rotor.

Generally, in a case where the tandem-type rotary pump is provided at a hydraulic pressure unit, a size of the hydraulic pressure unit in an axial direction of an electromagnetic valve (i.e. a size of a brake hydraulic pressure controlling apparatus) tends to be enlarged. On the other hand, according to the modified example, in which the tandem-type rotary pump is provided within the hydraulic pressure block 3 having the above-described configuration, the size of the hydraulic pressure unit 2 (the size of the brake hydraulic pressure controlling apparatus 1C) may be reduced.

According to the embodiments, because all of the electromagnetic valves 4 are arranged so as to adjacently surround the ECU board 11, each of the electromagnetic valves 4 is electrically connected to the electric circuit on the ECU board 10 without arranging the ECU board 11 at a position away from the hydraulic pressure unit 2 relative to the electromagnetic valves 4. Therefore, even if the brake hydraulic pressure controlling apparatus (1A, 1B, 1C) does not have a configuration in which the ECU board 11 and the electromagnetic valves 4 are arranged so as to overlap in the axial direction of the electromagnetic valves 4, the interference between each of the connecting wires may be avoided, which may further result in arranging the ECU board 11 at a position closer to the hydraulic pressure unit 2 and reducing the size of the brake hydraulic pressure controlling apparatus (1A, 1B, 1C) in the axial direction of the electromagnetic valves 4.

According to the embodiments, the plurality of the electromagnetic valves 4 are arranged at positions adjacent to the ECU board 11 along plural sides thereof.

Accordingly, because the electromagnetic valves 4 are arranges so as to adjacently surround the ECU board 11, the size of the ECU board 11 does not need to be formed so as to correspond to a setting area of the electromagnetic valves 4. As a result, the size of the ECU board 11 may be reduced.

Accordingly, in the case where the electromagnetic valves 4 are arranged along plural sides of the ECU board 11 at positions adjacent to the ECU board 11, the electromagnetic valves 4 are arranged in plural alignments. Accordingly, the electromagnetic valves 4 are arranged while maintaining a balance when comparing to an arrangement in which all of the electromagnetic valves 4 are aligned in one direction. Hence, a deformation of the brake hydraulic pressure controlling apparatus (1A, 1B, 1C), which is likely to occur when the arrangement (alignment) of the electromagnetic valves 4 is disturbed, may be avoided.

According to the embodiments, the entire ECU board is arranged between protruding end portions of the respective electromagnetic valves 4 in the axial direction thereof and the surface of the hydraulic pressure block 3 on which the electromagnetic valves 4 are arranged.

Accordingly, in the case where the entire ECU board 11 is enclosed by the protruding end portions of the respective electromagnetic valves 4 so as not to be positioned away from the hydraulic pressure block 3 relative to the protruding end portions of the respective electromagnetic valves 4, the increase of the length of the brake hydraulic pressure controlling apparatus (1A, 1B, 1C) (i.e. the increase of the length of the entire brake hydraulic pressure controlling apparatus including the ECU board 11) in the axial direction of the electromagnetic valves 4 may be avoided when comparing to a case where, for example, the ECU board is arranged at a position farther away from the hydraulic pressure block relative to the protruding end portions of the respective electromagnetic valves. As a result, the size of the brake hydraulic pressure controlling apparatus (1A, 1B, 1C) in the axial direction is surely reduced.

According to the embodiments, the plural electromagnetic valves 4 includes at least one normally-open type electromagnetic valve 4NO, whose valve portion is closed when the driving electric power is supplied thereto and is opened when the driving electric power is not supplied, and at least one normally-closed type electromagnetic valve 4NC, whose valve portion is opened when the driving electric power is supplied thereto and is closed when the driving electric power is not supplied. Plural cavities C, which serves at least one of the reservoir 7 for introducing thereto the brake fluid when at least one normally-closed type electromagnetic valve 4NC is opened to store the brake fluid, and the damper 8 for attenuating the pulsation of the brake fluid, are formed at the hydraulic pressure block 3. Each of the cavities C is formed so that the cross-sectional shape thereof taken along the direction orthogonal to the axial direction thereof. Is formed in the circular shape and is formed so as to extend in a direction orthogonal to an axis extending orthogonal to the surface of the hydraulic pressure block 3 on which the electromagnetic valves 4 are attached. Furthermore, the cavities C are arranged so as to overlap with each other when being viewed in the radial direction thereof, so that at least one normally-closed type electromagnetic valve 4NC is imbedded into the constriction portion formed between the neighboring cavities C.

Accordingly, in the case where the brake hydraulic pressure controlling apparatus (1A, 1B, 1C) includes plural cavities C, which serves as the reservoir 7 or the damper 8 and whose cross-sectional shape relative to the axis thereof is formed in the circular shape, so that plural cavities C are arranged in parallel with each other so as to overlap with each other when being viewed from the radial direction and where at least one of the normally-closed type electromagnetic valves 4NC are arranged so as to be embedded into the constriction portion formed between the neighboring cavities C, the spaces and the portions of the brake hydraulic pressure controlling apparatus (1A, 1B, 1C) are effectively utilized, thereby further reducing the size of the brake hydraulic pressure controlling apparatus (1A, 18, 1C).

Generally, a portion of the normally-closed type electromagnetic valve 4NC to be inserted into the hydraulic pressure block 3 is set to be shorter than a portion of the normally-open type electromagnetic valve 4NO to be inserted into the hydraulic pressure block 3. Therefore, by arranging the normally-closed type electromagnetic valves 4NC into the constriction portion formed between the neighboring cavities C, a distance between the neighboring cavities C may be shortened when comparing to a case where the normally-open type electromagnetic valves 4NO are embedded into the constriction portion. In the above-described embodiments, because of the above-described reasons, the normally-closed type electromagnetic valves 4NC are arranged at the constriction portion formed between the neighboring cavities C.

According to the embodiments, the ECU board 11 includes the package board, which is obtained by molding the integrated circuit by means of resin P together with the board.

Accordingly, the package board is adapted as the ECU board 11, so that the size thereof is reduced.

According to the embodiments, the pump 5 for generating the hydraulic pressure and applying the hydraulic pressure to the hydraulic circuit formed within the hydraulic pressure block 3, is provided within the hydraulic pressure block 3. The motor 6 is attached on the surface of the hydraulic pressure block 3 opposite from the surface thereof on which the electromagnetic valves 4 are attached.

Accordingly, the brake hydraulic pressure controlling apparatus (1A, 1B, 1C) drives the pump 5, which is provided within the hydraulic pressure block 3, by means of the motor 6, which is attached at the surface opposite from the surface on which the electromagnetic valves 4 are provided. As a result, the size of the brake hydraulic pressure controlling apparatus (1A, 1B, 1C) in the axial direction of the electromagnetic valves 4 may be reduced.

According to the second embodiment and the modified example, the portion of the surface of the hydraulic pressure block 3 for arranging the electromagnetic valves 4 is protruded in order to form the protruding portion 3a so as to correspond to the ECU board 11. The ECU board 11 contacts the protruding portion 3a.

Accordingly, because the protruding portion 3a is formed on the surface of the hydraulic pressure block 3, on which the electromagnetic valves 4 are attached, and the ECU board 11 is arranged so as to contact the protruding portion 3a, the heat dissipation is further improved.

According to the modified example of the second embodiment, the portion of the hydraulic circuit 3b, which is formed within the hydraulic pressure block 3, is formed at the interior of the protruding portion 3a.

According to the modified example of the second embodiment, the pump 5 for generating the hydraulic pressure and applying the hydraulic pressure to the hydraulic circuit formed within the hydraulic pressure block 3 is provided within the hydraulic pressure block 3. Furthermore, at least a portion of the pump 5 is positioned at the interior of the protruding portion 3a.

According to the modified example of the second embodiment, the pump 5 includes the tandem-type rotary pump, in which plural pump rotors 5a are arranged so as to be in parallel with one another in the axial direction of the electromagnetic valves 4.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A brake hydraulic pressure controlling apparatus for a vehicle, comprising:
 a hydraulic pressure block included in a hydraulic pressure unit and including therein a hydraulic circuit;
 a plurality of electromagnetic valves attached on a surface of the hydraulic pressure block and changing an opening degree of a passage of the hydraulic circuit; and
 an electronic control unit including an ECU board, which is electrically connected to the electromagnetic valves and on which an electronic control device executing a driving control of each of the electromagnetic valves is provided, and attached on the surface of the hydraulic pressure block so that the ECU board is covered by a case, wherein
 the ECU board of the electronic control unit is arranged within an area of the surface of the hydraulic pressure block and all of the plurality of the electromagnetic valves are arranged adjacently around the ECU board, and
 the plurality of electromagnetic valves includes a normally-open type electromagnetic valve, whose valve portion is closed when a driving electric power is supplied to the normally-open type electromagnetic valve and is opened when the driving electric power is not supplied, and a normally-closed type electromagnetic valve, whose valve portion is opened when the driving electric power is supplied to the normally-closed electromagnetic valve and is closed when the driving electric power is not supplied, a plurality of cavities, which serves at least one of a reservoir for introducing thereto a brake fluid when the normally-closed type electromagnetic valve is opened to store the brake fluid, and a damper for attenuating a pulsation of the brake fluid, and is formed at the hydraulic pressure block, wherein each of the cavities is formed so that a cross-sectional shape thereof taken along a direction orthogonal to an axial direction thereof is formed in a circular shape and is formed so as to extend in a direction orthogonal to an axis extending orthogonal to the surface of the hydraulic pressure block on which the plurality of the electromagnetic valves are attached, and wherein the cavities are arranged so as to overlap with each other when being viewed in a radial direction thereof, so that the normally-closed type electromagnetic valve is imbedded into a constriction portion formed between the neighboring cavities.

2. The brake hydraulic pressure controlling apparatus for the vehicle according to claim 1, wherein the plurality of the electromagnetic valves are arranged at positions adjacent to the ECU board along plural sides of the ECU board.

3. The brake hydraulic pressure controlling apparatus for the vehicle according to claim 1, wherein the entire ECU board is arranged between protruding end portions of the respective electromagnetic valves in an axial direction thereof and the surface of the hydraulic pressure block on which the electromagnetic valves are arranged.

4. The brake hydraulic pressure controlling apparatus for the vehicle according to claim 1, wherein the ECU board includes a package board, which is obtained by molding an integrated circuit by means of resin together with a board.

5. The brake hydraulic pressure controlling apparatus for the vehicle according to claim 1, wherein a pump for generating a hydraulic pressure and applying the hydraulic pressure to the hydraulic circuit formed within the hydraulic pressure block, is provided within the hydraulic pressure block, and a rotating device is attached on a surface of the hydraulic pressure block opposite from the surface thereof on which the electromagnetic valves are attached.

6. The brake hydraulic pressure controlling apparatus for the vehicle according to claim 1, wherein a portion of the surface of the hydraulic pressure block for arranging the electromagnetic valves is protruded in order to form a protruding portion so as to correspond to the ECU board, and the ECU board contacts the protruding portion.

7. The brake hydraulic pressure controlling apparatus for the vehicle according to claim 6, wherein a portion of the hydraulic circuit, which is formed within the hydraulic pressure block, is formed at an interior of the protruding portion.

8. The brake hydraulic pressure controlling apparatus for the vehicle according to claim 6, wherein a pump for generating a hydraulic pressure and applying the hydraulic pressure to the hydraulic circuit formed within the hydraulic pressure block is provided within the hydraulic pressure block, and at least a portion of the pump is positioned at an interior of the protruding portion.

9. The brake hydraulic pressure controlling apparatus for the vehicle according to claim 8, wherein the pump includes a tandem-type rotary pump, in which a plurality of pump rotors are arranged so as to be in parallel with one another in an axial direction of the electromagnetic valves.

* * * * *